US012477284B2

(12) United States Patent
Monsen et al.

(10) Patent No.: US 12,477,284 B2
(45) Date of Patent: Nov. 18, 2025

(54) TELECOIL SYSTEM PERIODIC INTERFERENCE CANCELLER

(71) Applicant: Starkey Laboratories, Inc., Eden Prairie, MN (US)

(72) Inventors: Thomas O. Monsen, Carver, MN (US); Justin R. Burwinkel, Eden Prairie, MN (US); Kenneth Kragh Jensen, Shakopee, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 327 days.

(21) Appl. No.: 18/354,864

(22) Filed: Jul. 19, 2023

(65) Prior Publication Data

US 2025/0030991 A1 Jan. 23, 2025

(51) Int. Cl.
*H04R 25/00* (2006.01)

(52) U.S. Cl.
CPC ....... *H04R 25/453* (2013.01); *H04R 2225/49* (2013.01); *H04R 2225/67* (2013.01); *H04R 2460/13* (2013.01)

(58) Field of Classification Search
CPC .............. H04R 25/453; H04R 2225/49; H04R 2225/67; H04R 2460/13
USPC ........................................................ 381/317
See application file for complete search history.

(56) References Cited

U.S. PATENT DOCUMENTS

| | | | | |
|---|---|---|---|---|
| 8,761,385 | B2 * | 6/2014 | Sugiyama | H04M 9/082 379/406.04 |
| 9,025,803 | B2 | 5/2015 | Sacha | |
| 2005/0111683 | A1 * | 5/2005 | Chabries | H03G 9/005 381/317 |
| 2016/0323043 | A1 | 11/2016 | Julstrom | |
| 2022/0021992 | A1 * | 1/2022 | Popovac | H04R 25/603 |

* cited by examiner

*Primary Examiner* — Suhan Ni
(74) *Attorney, Agent, or Firm* — Schwegman Lundberg & Woessner, P.A.

(57) ABSTRACT

Disclosed herein, among other things, are systems and methods for removing periodic interference from a telecoil signal for ear-wearable devices. A method includes receiving a signal from a telecoil of a hearing device, and determining a base period of periodic interference present in the signal. The signal is divided into clip samples having a clip length based on the base period, and the clip samples are used to create an averaged clip of the periodic interference. The averaged clip of periodic interference is inverted and summed with the signal to cancel the periodic interference from the signal, and audio from the summed signal is played for a wearer of the hearing device.

27 Claims, 5 Drawing Sheets

TELECOIL SYSTEM PERIODIC INTERFERENCE CANCELLER

TECHNICAL FIELD

This document relates generally to audio device systems and more particularly to systems and methods for cancelling or removing periodic interference from a telecoil signal for ear-wearable devices.

BACKGROUND

Audio devices can be used to provide audible output to a user based on received wireless signals. Examples of audio devices include speakers and ear-wearable devices, also referred to herein as hearing devices. Example of hearing devices include hearing assistance devices or hearing instruments, including both prescriptive devices and non-prescriptive devices. Specific examples of hearing devices include, but are not limited to, hearing aids, headphones, and earbuds.

In some examples, hearing aids are used to assist patients suffering hearing loss by transmitting amplified sounds to ear canals. In one example, a hearing aid is worn in and/or around a patient's ear. Hearing aids may include processors and electronics that improve the listening experience for a specific wearer or in a specific acoustic environment.

Telecoils or other magnetic sensors may be used to access wireless, non-acoustic audio transmissions, from telephone receivers and induction hearing loops, which ultimately provide hearing aid users access to speech with a greater signal to noise ratio (SNR). Telecoils are sensitive to magnetic fields and may sense signals that are potentially detrimental to sound quality, including from external sources such as magnetic fields from nearby electrical equipment, power lines, power transformers, vehicles, or the like. The magnetic fields produced by electrical equipment and power lines are characterized by cyclical fields that are highly correlated to the voltage fluctuations of alternating currents from associated power sources. The presence of these interfering signals may cause significant audibility and/or sound quality problems for the wearer of the device.

Thus, there is a need in the art for improved systems and methods for cancelling or removing periodic interference from a telecoil signal for ear-wearable devices.

SUMMARY

Disclosed herein, among other things, are systems and methods for removing periodic interference from a telecoil signal for ear-wearable devices. A method includes receiving a signal from a telecoil of a hearing device, and determining a base period of periodic interference present in the signal. The signal is divided into clip samples having a clip length based on the base period, and the clip samples are used to create an averaged clip of the periodic interference. The averaged clip of periodic interference is inverted and summed with the signal to cancel the periodic interference from the signal, and audio from the summed signal is played for a wearer of the hearing device.

Various aspects include a hearing device configured to cancel periodic interference present in a signal from a magnetic sensor. The hearing device includes a magnetic sensor configured to receive an inductive input, and at least one processor and data storage in communication with the at least one processor. The data storage comprises instructions thereon that, when executed by the at least one processor, causes the at least one processor to receive a signal from the magnetic sensor, and determine a base period of periodic interference present in the signal. The signal is divided into clip samples having a clip length based on the base period, and the clip samples are used to create an averaged clip of the periodic interference. The averaged clip of periodic interference is inverted, the inverted averaged clip is summed with the signal to cancel the periodic interference from the signal, and audio from the summed signal is played for a wearer of the hearing device.

This Summary is an overview of some of the teachings of the present application and not intended to be an exclusive or exhaustive treatment of the present subject matter. Further details about the present subject matter are found in the detailed description and appended claims.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

Figure 1A:
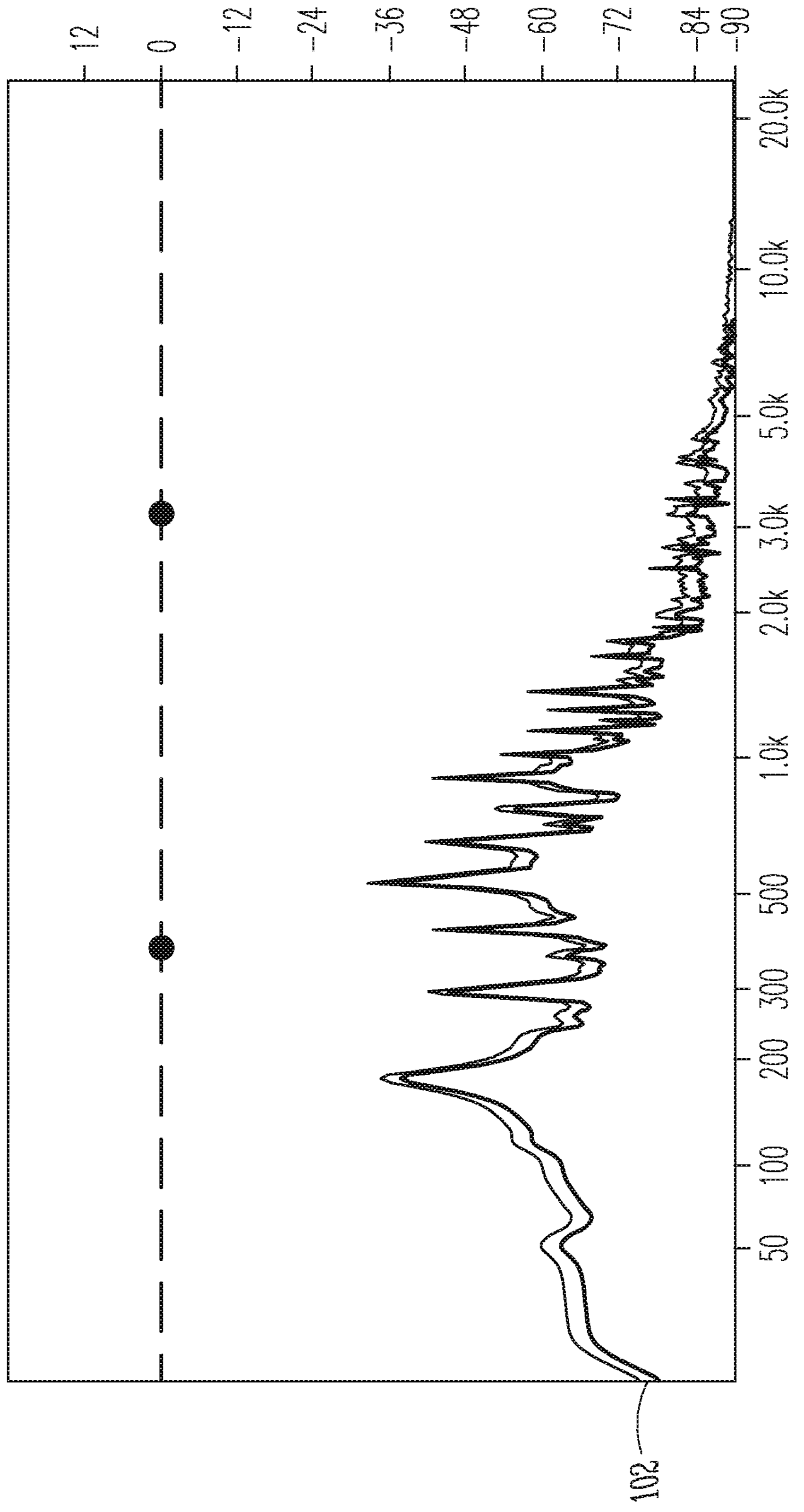
FIG. 1A illustrates a spectral analysis plot of a waveform, showing frequency composition of power grid type magnetic interference sensed by a telecoil.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment, including combinations of such embodiments. The following detailed description is demonstrative and not to be taken in a limiting sense. The scope of the present subject matter is defined by the appended claims, along with the full scope of legal equivalents to which such claims are entitled.

The present detailed description will discuss audio devices such as hearing devices and speakers. The description refers to hearing devices generally, which include earbuds, headsets, headphones and hearing assistance devices using the example of hearing aids. Other hearing devices include, but are not limited to, those in this document. It is understood that their use in the description is intended to demonstrate the present subject matter, but not in a limited or exclusive or exhaustive sense.

Telecoils or other magnetic sensors may be used to access wireless, non-acoustic audio transmissions, from telephone receivers and induction hearing loops, which ultimately provide hearing aid users access to speech with a greater signal to noise ratio (SNR). Telecoils are sensitive to magnetic fields and may sense signals that are potentially detrimental to sound quality, including from external sources such as magnetic fields from nearby electrical equipment, power lines, power transformers, vehicles, or the like. The magnetic fields produced by electrical equipment and power lines are characterized by cyclical fields that are highly correlated to the voltage fluctuations of alternating currents from associated power sources. These periodic interference sources can create a “hum” or “buzz” noise picked up by the telecoil of the hearing device. The presence of these interfering signals may cause significant audibility and/or sound quality problems for the wearer of the device.

It should be appreciated that the present subject matter addresses a significant challenge faced by hearing device users. Hearing device users are inherently unable to perceive magnetic field signals, and the perception of cyclical noises in acoustic sounds produced by hearing device receivers, such as the commonly known “hum” and “buzz” sounds, is generally regarded as “annoying” and “distracting” by the users of hearing devices. Moreover, the complex nature of these cyclical noises presents further obstacles for hearing device wearers. In instances where these noises are present, they can effectively mask important speech cues or musical notes of desired signals, which can require the hearing device wearer to expend additional cognitive resources to understand what they hear. The ability to accurately detect the precise cyclical onsets and offsets necessary to calculate base frequencies and determine the exact spectral compositions of the perceived “hum” and “buzz” noises, whether in real-time or otherwise, is virtually impossible for a hearing device wearer. Furthermore, it should be noted that the base frequencies and spectral content of cyclical noises exhibit dynamic characteristics over time and can vary across different locations. Achieving effective isolation of a cyclical noise through averaging requires a high degree of precision. Additionally, the timing accuracy of inverted noise clips’ playback is critical to mitigate cyclical noise perception, as inaccuracies in timing could potentially exacerbate the perception of such noises. Attempting such detections or calculations, or even cycling through various preset settings, would be mentally taxing and highly distracting for a hearing device user. The complexity and precision required to perform these calculations make it impractical and unfeasible for an individual to achieve accurate and reliable results solely through mental processes. The present subject matter provides a significant advantage by automatically mitigating and canceling out cyclical noises as the user listens to hearing loop and telephone receiver signals, where cyclical noises are present in the magnetic field(s) sensed by the telecoil. By utilizing advanced algorithms, signal processing techniques, and specialized hardware components described herein, the present subject matter provides a seamless and enjoyable auditory experience for hearing device users.

Hearing device users may activate the telecoils of their hearing devices in a variety of environments in order to receive non-acoustic audio transmissions from induction hearing loops. These assistive hearing systems operate by radiating electromagnetic fields which may then be sensed by a telecoil in the hearing device. Induction hearing loops may be deployed in locations where other potentially interfering electromagnetic fields also exist, such as in older-construction buildings, near electrical power lines, near electromagnetic communications equipment, near power transformers, in vehicles, on trains, etc. In some environments, induction hearing loop systems cannot be installed to meet Standard IEC-60118-4’s specification requirements for an electromagnetic noise floor, which ultimately prevents the provision of the induction hearing loop and hearing device users from their opportunity for equitable communication access as prescribed by, e.g., The Americans with Disabilities Act, the UK Equality Act, etc. In some cases, hearing loops may be installed in environments or situations where the IEC-60118-4’s requirements cannot be met, which may result in undesirable performance which may include the presence of cyclical magnetic fields being radiated in proximity to the where a hearing device user may receive the desired hearing loop signal and/or with a low signal output level which could result in an undesirable signal-to-noise ratio (SNR) for the desired hearing loop signal relative to the noise floor. In some examples, the methods of the present subject matter may also be useful when a hearing aid user activates the telecoil of their hearing device to access a non-acoustic audio transmission from the receiver of a telephone, a neck loop, or hearing aid compatible (HAC) smartphone in environments that have elevated electrical interference. It will be appreciated that this present subject matter may also be particularly useful for when hearing devices autonomously activate a telecoil function of a hearing device, using the devices and methods taught in, e.g., commonly-owned U.S. patent application Ser. No. 17/754,833, entitled “Hearing Assistance System with Automatic Hearing Loop Memory”, which is hereby incorporated by reference it its entirety.

The present subject matter provides a method of signal processing that significantly reduces the humming and buzzing interference that telecoils are sensitive to, as a way of improving sound quality and potentially allowing more of the desired signal to be audible, all without compromising the sound quality or original features of the desired signal broadcasted by induction hearing loop systems and telephones.

The present subject matter provides a method for a hearing device to actively reduce the interference in a telecoil signal that is caused by periodic sources that do not rapidly change in frequency, amplitude, or spectral content, e.g., electrical mains, light rail motors, etc. In various examples, the present method identifies moments when interference is the primary sound being received, such as when a speech and/or music signal is not being broadcasted by an induction hearing loop system or telephone receiver, and records and averages a plurality of samples of varying durations of the input signal to determine the fundamental frequency of the interference. In one example, the fundamental frequency of electrical power interference in the U.S. is approximately 60 hz or 16.6 ms. The system then inverts this averaged sample, and plays it in a continuous loop to cancel the interference. In some examples, the averaged sample continues to be updated e.g., using an averaging window, as additional, new predominantly-interference sections of audio arrive, allowing the system to adapt to slow changes in the interference caused by the user’s motion (toward or away from the source of interference) or changes in the interference itself (power grid base frequency or spectral variation, light rail motor speed, etc.)

In some examples, the rate of sampling, the minimum number of samples averaged, and/or the tolerance for accepting samples containing speech and/or music may be adapted based on the input of operantly connected motion sensor data. It will be appreciated that acceptance criteria may be determined in a variety of ways, such as with one or more thresholds, and/or with one or more statistics, e.g., confidence levels, confidence intervals, weighting factors, statistical models, performance metrics, contextual factors, historical trends, user preferences, decision analysis, and other suitable factors, etc. For example, the cyclical magnetic field of a light rail motor may change in intensity and/or frequency as the velocity of the vehicle changes, and the ability of the system to adapt sample averages more quickly may yield a more accurate cancellation of the undesirable cyclical signals. This approach may also be useful for detecting and adapting to changes in the wearer's head orientation and posture, which may also cause changes in the spectral composition of the cyclical noises in the telecoil input signal. It should be understood that the examples provided above are not exhaustive, and various other factors, methodologies, or parameters may be employed as part of the acceptance criteria. The determination of such criteria may be based on a combination of factors and techniques, including but not limited to the ones described above. These criteria may be dynamically adjusted or optimized to improve the accuracy and reliability of the cancellation or detection process based on the specific requirements of the system and the prevailing environmental conditions. Furthermore, artificial intelligence (AI) decision criteria may be implemented using appropriate algorithms, machine learning techniques, data analysis methodologies, or rule-based systems, depending on the specific application and desired performance characteristics. The AI model may be trained using relevant training data, and the decision criteria may evolve over time through iterative learning or adaptation processes to enhance the system's capabilities. In summary, the AI decision criteria for determining acceptance of samples containing speech and/or music, as well as other aspects of the system's functionality, may involve a combination of one or more tolerance thresholds and/or one or more tolerance statics to ensure acceptably accurate cancellation of undesired signals and adaptability to changing conditions.

Previous attempts to mask periodic interference included a delay and sum approach, but resulted in undesirable comb filtering of the telecoil signal which left undesirable artifacts in the telecoil signal that adversely affected audibility of speech and music. Other previously attempted approaches required intrusive spectral filtering and/or aggressive expansion techniques which reduced the audibility of desirable sounds, such as speech and music content, as well as the undesirable cyclical noises. The present subject matter is advantageous over the previous solutions in that it uses content determination and periodic averaging to derive a clean and isolated version of the periodic interference that is used as a cancelling signal to reduce hum while preserving all (or, in some examples, nearly all) of the original, perceivable features of speech or music content.

While electrical hum in a telecoil signal may be very annoying to hearing device users, particularly those with more mild degrees of hearing loss, this type of interference is typically highly periodic with little to no short term variation which makes it more predictable and easier to eliminate than highly dynamic background noise that can be observed in acoustic microphone signals. In some examples, the predictable effects of telecoil orientation and vehicle velocity are used to predict and/or adapt optimal changes to the spectral composition of the averaged samples and/or sampling rate, and/or the threshold(s)/statistic(s) used to describe the tolerance for accepting samples with speech and/or music content. Additionally, hearing loops and other sources of telecoil signals almost invariably have large (0.5 seconds or longer) periods when there is no significant content transmitted and wherein most of what a telecoil picks up is noise or interference. The present subject matter leverages these characteristics to derive a clean and isolated hum signal to use for noise cancelling.

FIG. 1A illustrates a spectral analysis plot of a waveform 102 showing frequency composition of power grid type magnetic interference sensed by a telecoil. The graph provides a fast Fourier transform (FFT) showing the general frequency makeup of a typical magnetic interference or "hum." While the base frequency of the U.S. power grid is 60 Hz, telecoil interference from the power grid has almost no 60 Hz content, and the interference picked up by a telecoil spreads across a large swathe of the audible frequency range, making notch filter type hum cancelling undesirable since it would affect the desired signal significantly.

To reduce this periodic interference, in some examples, the present subject matter derives a clean/isolated reference version of the magnetic interference waveform, without any significant content from other sources. The first step is to break up incoming audio into clip samples, the length of which is matched to a multiple of the base period of the interference. In some examples, the length of the clip samples is approximately equal to one base period of the interference. In other examples, the length of the clip samples may be two or more base periods of the interference. Clip samples that contain primarily desired content (speech or music) may be rejected, either by a comparing the amplitude of the clip samples to an energy level threshold, by using the output of sound classification algorithms (e.g., speech classifier, music classifier, modulation detection, and the like), or by some other similar means to avoid contaminating the cancellation signal with spectral content from desirable signals. The remaining clips are fed to a continuously-updating running average to produce a averaged clip, which has the effect of reducing or averaging out random noise and leaving, primarily, only the repeating periodic magnetic interference.

In various examples, the averaged clip can be played in a repeating loop to recreate a cleaned up version of the magnetic interference. Since the clip is a multiple of the base interference frequency, it remains synchronized reasonably well over time, even when it cannot be refreshed with new audio clips for several seconds due to the presence of desired signal content. In various examples, after the averaged clip has been looped, it can be inverted and summed with the original telecoil signal (with a predetermined delay if needed to maintain temporal alignment) to effectively cancel out the periodic interference present in the telecoil signal. In some examples, the spectral content of the recorded clip may be adapted over time in response to input received from an operatively connected motion sensor. In some examples, the adaptations initiated based on motion sensor data may be informed by historical sampling or predicted by machine learning algorithms trained on previously collected samples.

According to various examples, determining the base period of the periodic interference ensures proper clip length of samples used in the present subject matter. An incorrect clip length may result in an inferior derived hum signal, and may cause cumulative error-type misalignment with the hum in the telecoil signal when continuous refreshing of the averaged clip sample is not possible. The base period of the hum will not always be 16.66 ms, since even the U.S. power grid frequency varies slightly over time as grid load changes. Also, most of Europe uses 50 Hz power, commercial airplanes typically use 400 hz, and components of light rail and automotive electrical interference will change frequency and/or spectral content as the vehicle velocity changes. In some examples, an initial estimate of the base period of the interference may be derived from a cepstral analysis, to determine how far apart harmonics are in a Fast Fourier Transform (FFT).

In various examples, the present subject matter determines the base period of the interference by varying the clip sample length while the rolling average is monitored. The averaged signal reaches peak amplitude when the clip length is exactly a multiple of the base period, resulting in all the peaks lining up additively rather than semi-cancelling due to being slightly out of phase. Alternatively, the zero-crossing points of the averaged clip may be observed, and any drift toward or away from the clip start point would indicate incorrect clip length and give a reasonable indication of how much the clip length should be adjusted by, and in what direction.

In some examples, the sampling rate or timing may be adapted responsive to the input of an operatively connected motion sensor, such as an inertial measurement unit (IMU), accelerometer, barometer, gyroscope, or an operatively connected positioning sensor, such as a global positioning system (GPS). The process to determine the base period may take place over a time period of up to or exceeding several seconds with little to no content beyond the hum, but once the base period has been established, it is likely to remain accurate for minutes or even hours at a time for the interference caused by a power grid, although airplane and light rail hum frequency may change much more rapidly.

The above method is most effective in circumstances where there is little audible content beyond the periodic interference most of the time, such as buses, planes, or light rail where there is time between announcements, and also for spoken word content, which inherently contains many pauses where new audio clip samples can be collected to update the algorithm's cancellation waveform. However, in cases where the running average of clip samples cannot be refreshed for some time due to the presence of louder signal content, the cancellation signal may fail to follow changes in phase, spectral content, or amplitude of the received periodic interference waveform, resulting in imperfect cancellation, or even worse, an additive effect that makes the hum even louder.

To mitigate this type of periodic interference, the present method may fade out the cancellation waveform after a predetermined period in which refreshing was impossible, and then fade in the cancellation waveform once refreshing is possible again, in various examples. This fading may cause some noticeable re-appearance of the hum during content and for a brief moment afterwards, but since interference is seldom very loud relative to desired content it is unlikely to be objectionable for brief periods of time where there is speech and/or music content. In various examples, the fading may be accomplished by simply discarding clip samples with too much speech or music content, and instead including silence or null clips in the running average at these times, which may gradually reduce the amplitude of the cancellation signal. Fading may also be accomplished by other means or using other criteria, in various examples.

As an alternative to fading, during longer periods of desired content which masks the periodic noise, a significantly larger number of clips may be averaged. This strategy may allow for a greater rejection of "noise" (in this case, the desired content of the hearing loop or telephone receiver signal) from the cancellation track, but may also incur a greater risk of cumulative phase drift causing cancellation signal degradation. However, it may be a reasonable compromise for concerts or other situations where there are long time periods that are not silent, but also are not loud enough to completely mask the periodic interference. This strategy may not be useful for periods where the hum is more than 20 dB quieter than the other signal content, so it may be useful for the hearing device to continuously estimate the relative levels of hum noise and desired content.

In some examples, methods of speech detection, speech modulation detection, music detection, and the like may be used to detect the onset and/or offset of "speech-free" and "music-free" periods during which it would be ideal to collect updated telecoil input audio clip samples. In a similar manner, these algorithms may be used to extinguish telecoil audio sampling to help prevent sampling from occurring during segments where speech and/or music content is occurring. In some embodiments, future periods where speech or music will be likely or unlikely to exist in the clip samples may be predicted using any suitable method, e.g., using machine learning techniques, as there are inherit, predictable patterns for pauses in both speech and music.

Figure 1B:
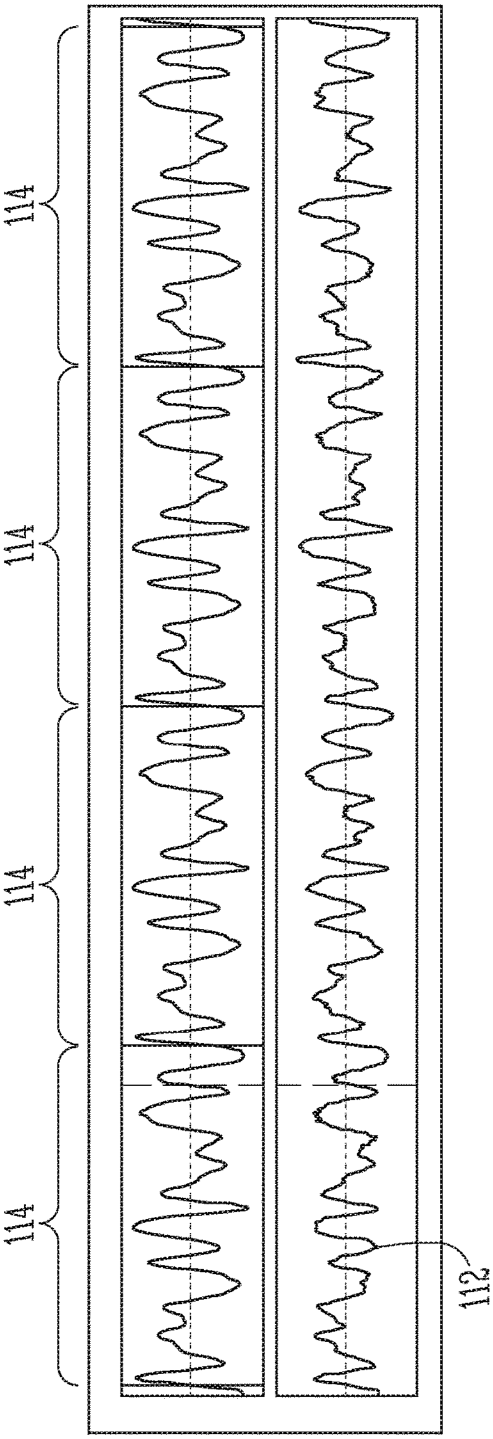
FIG. 1B illustrates a graphical diagram of waveforms of averaged clip samples compared to the original signal of a corresponding telecoil output for an ear-wearable device, according to various examples of the present subject matter.

FIG. 1B illustrates a graphical diagram of waveforms of averaged clip samples 114 compared to the original signal 112 of a corresponding telecoil output for an ear-wearable device, according to various examples of the present subject matter. In this example, the original signal 112 includes primarily random noise and electrical periodic interference. The averaged clip samples 114 are repeated and illustrate how the averaging of clip samples of the present subject matter removes random noise, leaving the periodic interference signal, which can be inverted and summed with the original signal 112 to remove, cancel and/or mitigate the periodic interference signal.

Figure 1C:
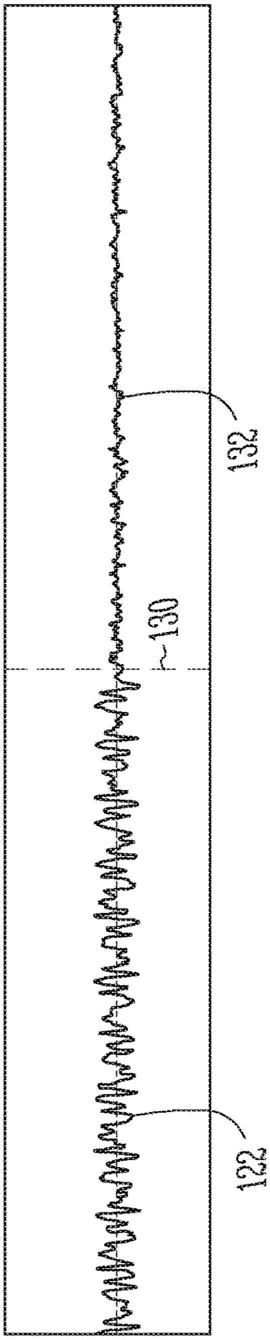
FIG. 1C illustrates a graphical diagram of a waveform of telecoil output before and after applying cancellation, according to various examples of the present subject matter.

FIG. 1C illustrates a graphical diagram of a waveform of telecoil output before and after applying cancellation, according to various examples of the present subject matter. In the depicted embodiment, the telecoil signal 122 has the cancellation applied at time 130. As the cancellation signal is added as described above, the resulting signal 132 has a significant reduction in amplitude of the noise, as the majority of the periodic noise has been eliminated. In one example, the introduction of the periodic interference cancellation signal reduced the root mean square (RMS) energy of the signal 9 dB by cancelling most of the periodic hum content. It should be appreciated that the amount of periodic hum present in the signal may vary based on context and telecoil orientation. Thus, in other examples, the introduction of the periodic interference cancellation signal can reduce the RMS energy of the signal levels in a telecoil signal by a range of values. These values may include, but are not limited to, reductions of 24 dB, 21 dB, 18 dB, 15 dB, 12 dB, 6 dB, 3 dB, 1 dB, or any combination thereof. The range of reduction values can encompass values between these specific examples. Other reduction amounts are possible without altering signal level or quality for desired content, and without departing from the scope of the present subject matter.

In various examples, the present subject matter may be applied to any signal source, such as-microphone or radio signals, if elimination of a periodic interference is desired, and there is relatively little other noise in portions of the signal. If the presence of non-periodic noise makes period determination of the periodic noise component difficult in one input mode, another input mode could be used to find the base period, in various examples. For example, a telecoil signal may be used to determine the base period of electrical hum so that the hum cancelling algorithm can work on a microphone signal, which also has hum from the same physical source but has so much random noise that its signal could not be used to reliably determine the base period. This alternative may be especially useful for car engine noise, which has the same period as the magnetic signal from, e.g., the spark plug wires, alternator, fans, compressors, motors, and the like or for acoustically audible transformer hum.

In a binaural hearing device system in which a user has a device in each ear, base period values of the periodic noise (or other parameters of the present subject matter) may be shared from one device in the set to other, in various examples. In some examples, base period values may be shared between devices of different users in a common acoustic environment, such as when one of the users is able to get a clearer hum signal for base period determination, due to proximity to hum source for instance. This sharing of parameters for cancellation may allow for faster reaction to and cancellation of periodic noise signal. Any suitable method for data sharing may be implemented, including peer-to-peer device communications, the use of cloud computing, mesh networks, and the like. In some examples, the base period can be detected by the equipment used to produce the desired hearing loop signal (or an accessory device thereof in proximity to the hearing loop and/or hearing loop driver). In some examples, information regarding the base frequency and/or the spectral content of cyclical noise may be shared with hearing devices by embedding modulated signals into the hearing loop broadcast signal and/or sharing the data using an out-of-band signal, and/or electromagnetic radio communication protocol, such as Bluetooth®, Bluetooth® Low Energy (BLE), Auracast, 900 MHZ, and the like. The present subject matter may also be used to cancel internally generated constant tonal artifacts for a hearing device, in some examples. In other examples, the present subject matter may be applied to live music or audio production as well as post-recording as a "de-buzzing" plugin software tool. In some examples, the present subject matter may be used with preamps, recording interfaces, and/or speaker amplifiers to cancel line noise and/or hum.

According to various examples, multiple instances of this algorithm may be applied to the same signal to cancel unrelated periodic content, such as hums or tones that do not share a common base frequency. In this case, the multiple instances may either be implemented in parallel (all using the same input signal), or series (second algorithm using output of first one as its input), with series implementation potentially being more effective if one periodic noise source is very loud and masks the other sources. In various examples with different input selection criteria, the present subject matter may be used to reduce tonal content in speech, such as to isolate fricative, sibilant, and explosive sounds for separate processing or clarity. This algorithm may be used to separate these components of speech from the higher tonal harmonics of vowels, in some examples. In other examples, a version of the present subject matter may be used as a feedback canceller.

Figure 2:
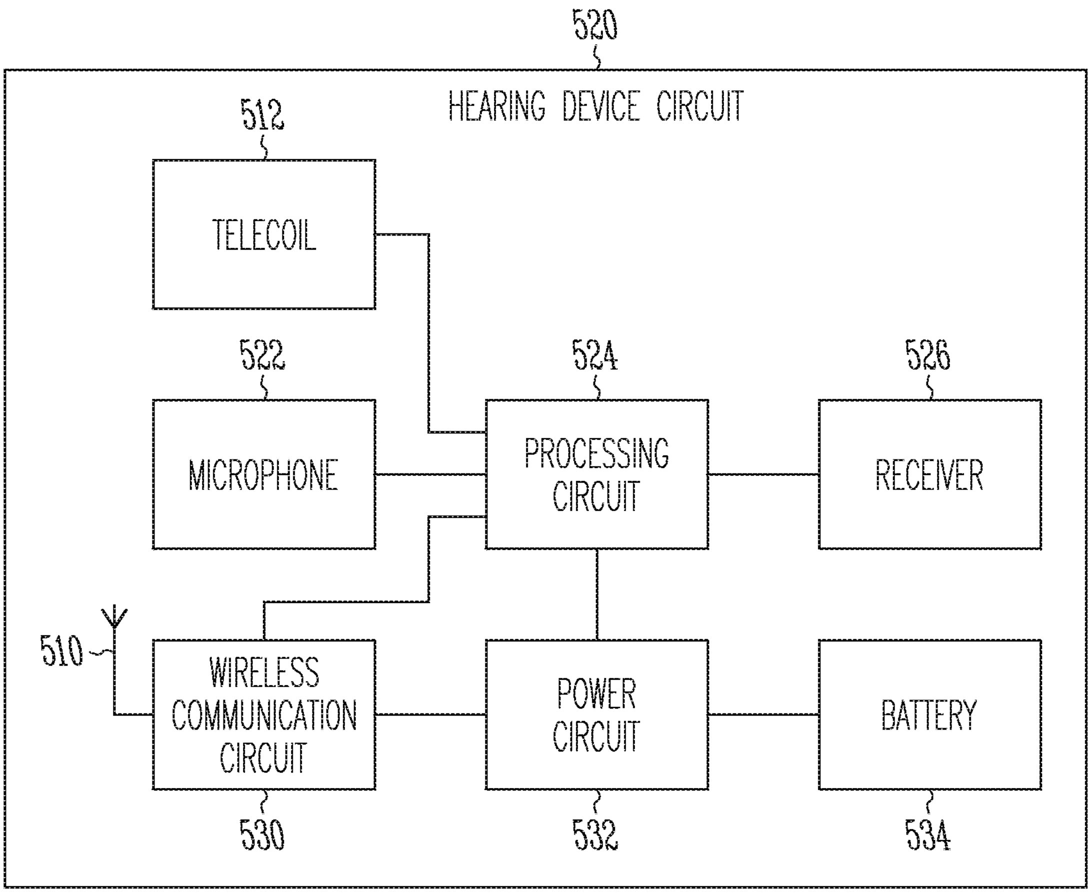
FIG. 2 illustrates a block diagram of a hearing device circuit, according to various examples of the present subject matter.

FIG. 2 illustrates a block diagram of a hearing device circuit, according to various examples of the present subject matter. Hearing device circuit 520 represents an example of portions of a hearing device and includes a microphone 522, a wireless communication circuit 530, an antenna 510, a telecoil 512, a processing circuit 524, a receiver (speaker) 526, a battery 534, and a power circuit 532. Microphone 522 receives sounds from the environment of the hearing device user (wearer of the hearing device). Wireless communication circuit 530 communicates with another device wirelessly using antenna 510, including receiving programming codes, streamed audio signals, and/or other audio signals and transmitting programming codes, audio signals, and/or other signals. Examples of the other device includes other hearing devices of other users, another hearing device of a pair of hearing devices for the same wearer, a hearing device host device, an assistive listening device (ALD), an audio streaming device, a smartphone, and other devices capable of communicating with hearing devices wirelessly. Processing circuit 524 controls the operation of hearing device using the programming codes and processes the sounds received by microphone 522 and/or the audio signals received by wireless communication circuit 530 and magnetic sensors (such as telecoil 512) to produce output sounds. Receiver 526 transmits output sounds to an ear canal of the hearing device wearer. Battery 534 and power circuit 532 constitute the power source for the operation of hearing device circuit 520. In one example, power circuit 532 can include a power management circuit. In another alternative or additional example, battery 534 can include a rechargeable battery, and power circuit 532 can include a recharging circuit for recharging the rechargeable battery.

In various examples, the hearing device is configured to cancel interference from a magnetic sensor signal. The hearing device circuit 520 includes a magnetic sensor, such as a telecoil 512, configured to receive an inductive input, and at least one processor or processing circuit 524 and data storage in communication with the processing circuit 524. The data storage comprises instructions thereon that, when executed by the processing circuit 524, causes the processing circuit 524 to receive a signal from the magnetic sensor or telecoil 512, and determine a base period of periodic interference present in the signal. The signal is divided into clip samples having a clip length based on the base period, and the clip samples are used to create an averaged clip of the periodic interference. The averaged clip of periodic interference is inverted, the inverted averaged clip is summed with the signal to cancel the periodic interference from the signal, and audio from the summed signal is played for a wearer of the hearing device. The signal is played for the wearer using the receiver 526, in various examples. According to various examples, the present subject matter may be used with any type of magnetic sensor configurable for use in a hearing device or speaker, including but not limited to telecoils or solid state magnetic sensors such as giant magneto resistance (GMR) sensors or tunnel magneto resistance (TMR) sensors.

In various examples, the periodic interference includes magnetic energy from an external electrical power source, such as electrical power lines or transformers, electromagnetic communication equipment, or vehicle power systems. The processing circuit 524 may be further programmed to play the averaged clip in a repeating loop to create a cleaned up version of the periodic interference, in an example. According to various examples, the processing circuit 524 is programmed to examine the clip samples of the signal, identify one or more clip samples that contain primarily desired audio content, and exclude the identified one or more clip samples when creating the averaged clip of periodic interference. In some examples, to identify the one or more clip samples that contain primarily desired audio content, the processing circuit 524 is programmed to compare the clip samples to an energy level threshold and/or to use an audio content classifier. The hearing device circuit 520 may be included in an ear bud, headphones, a hearing aid, or other ear-wearable or implantable device, in various examples.

In still other examples, the hearing device may communicate with a body worn device such as on a neck loop with a Bluetooth radio and such a body worn device may include a telecoil transmitter to convey the audio to a person wearing a hearing aid or hearing aids equipped with a telecoil 512. Various types of wireless connections may be used, including but not limited to Bluetooth® (such as Bluetooth® 5.2, for example), Bluetooth® Low Energy (BLE) connections, Auracast connections, FM radio connections, DM radio connections, infrared communications, 900 MHz, and the like.

In various examples, at least one of the hearing devices includes a connection to a smartphone application. The smartphone application is configured to be used to control the hearing devices, in some examples. In some examples, a smartphone and/or smartwatch application may be used to coordinate communication between a binaural set of hearing devices and/or devices worn by multiple users. In some examples, at least one of the hearing devices includes a voice control configured to be used to control the hearing devices. In various examples, at least one of the hearing devices is a hearing assistance device, such as a hearing aid, a cochlear implant, or a bone-conduction hearing device.

Figure 3:
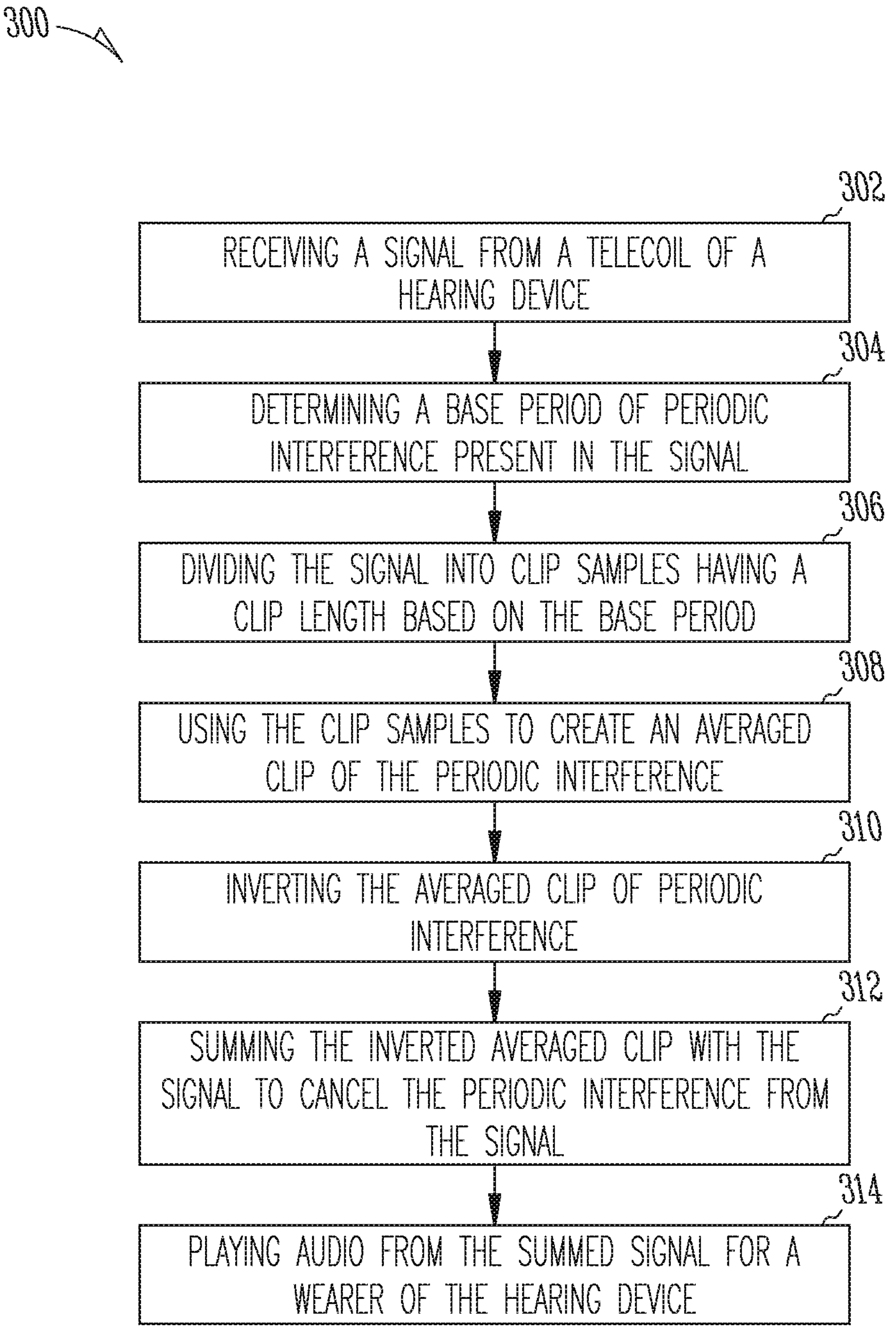
FIG. 3 illustrates a flow diagram of a method for cancelling periodic interference from a telecoil signal for ear-wearable devices, according to various examples of the present subject matter.

FIG. 3 illustrates a flow diagram of a method for cancelling periodic interference from a telecoil signal for ear-wearable devices, according to various examples of the present subject matter. The method 300 includes receiving a signal from a telecoil of a hearing device at step 302, and determining a base period of periodic interference present in the signal, at step 304. At step 306, the signal is divided into clip samples having a clip length based on the base period, and the clip samples are used to create an averaged clip of the periodic interference, at step 308. At step 310, the averaged clip of periodic interference is inverted, and at step 312 the inverted averaged clip is summed with the signal to cancel the periodic interference from the signal. At step 314, audio from the summed signal is played for a wearer of the hearing device.

In various examples, using the clip samples to create the averaged clip includes feeding the clip samples to a continuously-updating running average. The method 300 further includes playing the averaged clip in a repeating loop to create a cleaned up version of the periodic interference, in various examples. In one example, summing the inverted averaged clip with the signal includes using a predetermined delay to maintain temporal alignment. The method 300 may further include examining the clip samples of the signal, identifying one or more clip samples that contain primarily desired audio content, and excluding the identified one or more clip samples when creating the averaged clip of periodic interference. Identifying the one or more clip samples that contain primarily desired audio content includes comparing the clip samples to an energy level threshold and/or using an audio content classifier, in some examples. In various examples, to determine the base period of periodic interference present in the signal, the present subject matter may us a cepstral analysis to determine distance between harmonics. In other examples, to determine the base period of periodic interference present in the signal, the present subject matter may change clip sample length and monitor a rolling average and/or averaging window of the clip samples. In further examples, to determine the base period of periodic interference present in the signal, the present subject matter may monitor zero-crossing points of the averaged clip. In some examples, to determine the base period of periodic interference present in the signal, the present subject matter may adapt sampling rate or timing responsive to an input of an operatively connected motion sensor or positioning sensor. In other examples, this method may be used with other types of magnetic sensors besides telecoils, including but not limited to solid state magnetic sensors such as giant magneto resistance (GMR) sensors or tunnel magneto resistance (TMR) sensors.

In some examples, the hearing device includes or is connected to a motion sensor or a position sensor. Determining the base period of periodic interference present in the signal includes adapting sampling rate or timing responsive to data from the motion sensor or the position sensor, in some examples. The method may further include adapting one or more of a minimum number of samples averaged or one or more tolerance thresholds/statistics for accepting samples containing desired audio content based on data from the motion sensor or the position sensor.

Figure 4:
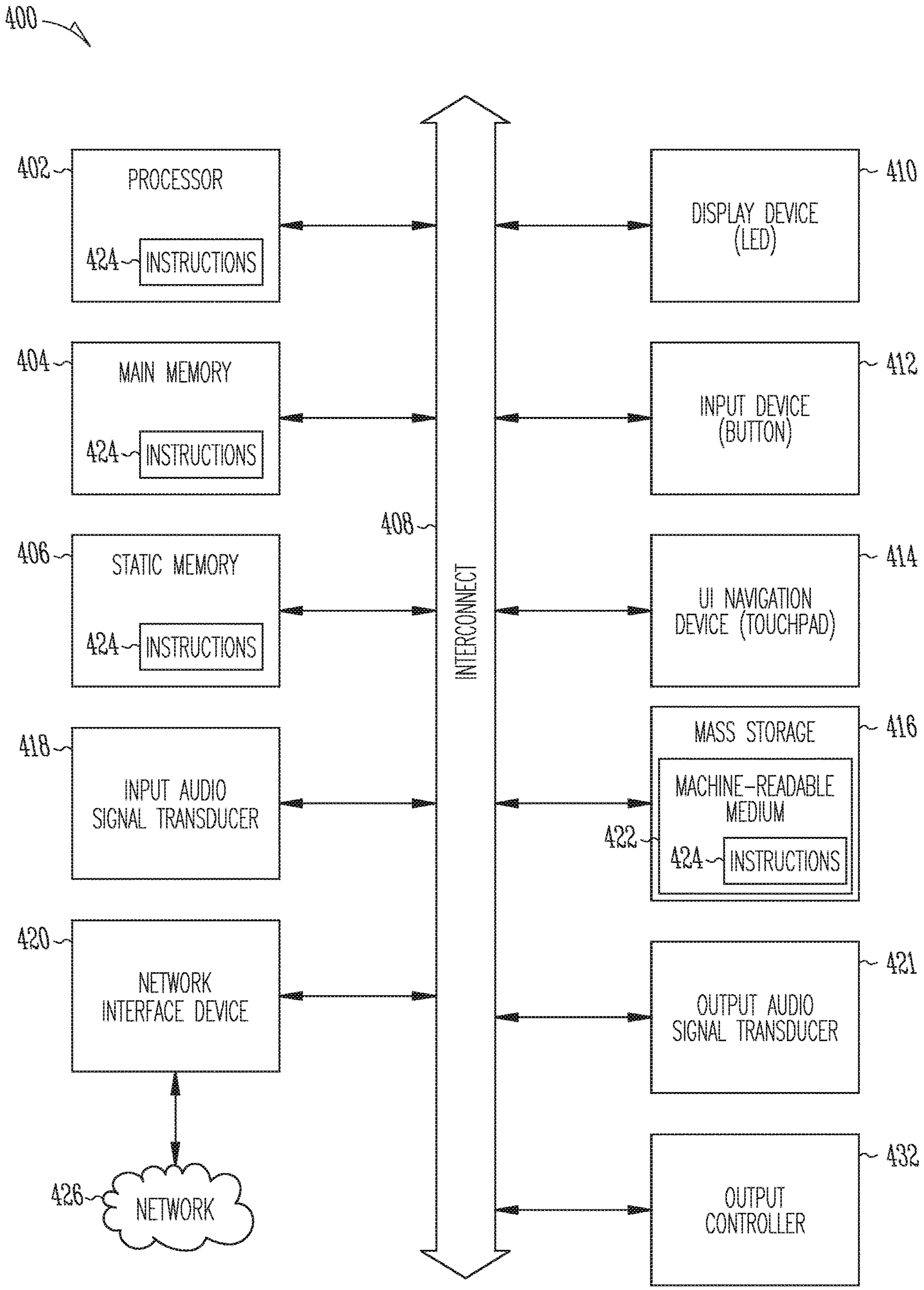
FIG. 4 illustrates a block diagram of an example machine upon which any one or more of the techniques discussed herein may perform.

FIG. 4 illustrates a block diagram of an example machine 400 upon which any one or more of the techniques (e.g., methodologies) discussed herein may perform. In alternative examples, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a hearing device, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, one or more input audio signal transducers 418 (e.g., microphone), a network interface device 420, and one or more output audio signal transducer 421 (e.g., speaker). The machine 400 may include an output controller 432, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to communicate wirelessly using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400, and includes digital or analog communications signals or other intangible medium to facilitate communication of such software.

Various examples of the present subject matter support wireless communications with a hearing device. In various examples the wireless communications may include standard or nonstandard communications. Some examples of standard wireless communications include link protocols including, but not limited to, Bluetooth™, Bluetooth™ Low Energy (BLE), IEEE 802.11 (wireless LANs), 802.15 (WPANs), 802.16 (WiMAX), cellular protocols including, but not limited to CDMA and GSM, ZigBee, and ultra-wideband (UWB) technologies. Such protocols support radio frequency communications and some support infrared communications while others support NFMI. Although the present system is demonstrated as a radio system, it is possible that other forms of wireless communications may be used such as ultrasonic, optical, infrared, and others. It is understood that the standards which may be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, SPI, PCM, ATM, Fibre-channel, Firewire or 1394, InfiniBand, or a native streaming interface. In various examples, such connections include all past and present link protocols. It is also contemplated that future versions of these protocols and new future standards may be employed without departing from the scope of the present subject matter.

Hearing assistance devices typically include at least one enclosure or housing, a microphone, hearing assistance device electronics including processing electronics, and a speaker or "receiver." Hearing assistance devices may include a power source, such as a battery. In various examples, the battery is rechargeable. In various examples multiple energy sources are employed. It is understood that in various examples the microphone is optional. It is understood that in various examples the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing assistance devices include a processor. In digital hearing assistance devices with a processor, programmable gains may be employed to adjust the hearing assistance device output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application may be performed using the processor or over different devices. In some examples, processing may be duty-cycled between two or more operatively connected processors as a means to efficiently manage power consumption and/or signal processing resources. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing. In various examples of the present subject matter the processor is adapted to perform instructions stored in one or more memories, which may or may not be explicitly shown. Various types of memory may be used, including volatile and nonvolatile forms of memory. In various examples, the processor or other processing devices execute instructions to perform a number of signal processing tasks. Such examples may include analog components in communication with the processor to perform signal processing tasks, such as sound reception by a microphone, or playing of sound using a receiver (i.e., in applications where such transducers are used). In various examples of the present subject matter, different realizations of the block diagrams, circuits, and processes set forth herein may be created by one of skill in the art without departing from the scope of the present subject matter.

It is further understood that different hearing devices may embody the present subject matter without departing from the scope of the present disclosure. The devices depicted in the figures are intended to demonstrate the subject matter, but not necessarily in a limited, exhaustive, or exclusive sense. It is also understood that the present subject matter may be used with a device designed for use in the right ear or the left ear or both ears of the wearer.

The present subject matter is demonstrated for hearing devices, including hearing assistance devices, including but not limited to, behind-the-ear (BTE), in-the-ear (ITE), in-the-canal (ITC), receiver-in-canal (RIC), invisible-in-canal (IIC) or completely-in-the-canal (CIC) type hearing assistance devices. It is understood that behind-the-ear type hearing assistance devices may include devices that reside substantially behind the ear or over the ear. Such devices may include hearing assistance devices with receivers associated with the electronics portion of the behind-the-ear device, or hearing assistance devices of the type having receivers in the ear canal of the user, including but not limited to receiver-in-canal (RIC) or receiver-in-the-ear (RITE) designs. The present subject matter may also be used in hearing assistance devices generally, such as cochlear implant or brainstem implant type hearing devices. The present subject matter may also be used in deep insertion devices having a transducer, such as a receiver or microphone. The present subject matter may be used in bone conduction hearing devices, in some examples. The present subject matter may be used in devices whether such devices are standard or custom fit and whether they provide an open or an occlusive design. It is understood that other hearing devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A method, comprising:

receiving a signal from a telecoil of a hearing device;

determining a base period of periodic interference present in the signal;

dividing the signal into clip samples having a clip length based on the base period;

using the clip samples to create an averaged clip of the periodic interference;

inverting the averaged clip of periodic interference;

summing the inverted averaged clip with the signal to cancel the periodic interference from the signal; and playing audio from the summed signal for a wearer of the hearing device.

2. The method of claim 1, wherein using the clip samples to create the averaged clip includes feeding the clip samples to a continuously-updating running average.

3. The method of claim 1, further comprising playing the averaged clip in a repeating loop to create a cleaned up version of the periodic interference.

4. The method of claim 1, wherein summing the inverted averaged clip with the signal includes using a predetermined delay to maintain temporal alignment.

5. The method of claim 1, comprising:

examining the clip samples of the signal;

identifying one or more clip samples that contain primarily desired audio content; and excluding the identified one or more clip samples when creating the averaged clip of periodic interference.

6. The method of claim 5, wherein identifying the one or more clip samples that contain primarily desired audio content includes comparing the clip samples to an energy level threshold.

7. The method of claim 5, wherein identifying the one or more clip samples that contain primarily desired audio content includes using an audio content classifier.

8. The method of claim 1, wherein determining the base period of periodic interference present in the signal includes using a cepstral analysis to determine distance between harmonics.

9. The method of claim 1, wherein determining the base period of periodic interference present in the signal includes changing clip sample length and monitoring a rolling average of the clip samples.

10. The method of claim 1, wherein determining the base period of periodic interference present in the signal includes monitoring zero-crossing points of the averaged clip.

11. The method of claim 1, wherein the hearing device includes or is connected to a motion sensor or a position sensor.

12. The method of claim 11, wherein determining the base period of periodic interference present in the signal includes adapting sampling rate or timing responsive to data from the motion sensor or the position sensor.

13. The method of claim 11, further comprising:

adapting one or more of a minimum number of samples averaged or one or more of a tolerance statistic and a tolerance threshold for accepting samples containing desired audio content based on data from the motion sensor or the position sensor.

14. A hearing device, comprising:

a magnetic sensor configured to receive an inductive input; and at least one processor and data storage in communication with the at least one processor, wherein the data storage comprises instructions thereon that, when executed by the at least one processor, causes the at least one processor to:

receive a signal from magnetic sensor;

determine a base period of periodic interference present in the signal;

divide the signal into clip samples having a clip length based on the base period;

use the clip samples to create an averaged clip of the periodic interference;

invert the averaged clip of periodic interference;

sum the inverted averaged clip with the signal to cancel the periodic interference from the signal; and play audio from the summed signal for a wearer of the hearing device.

15. The device of claim 14, wherein the periodic interference includes an external electrical power source.

16. The device of claim 15, wherein the external electrical power source includes electrical power lines or transformers.

17. The device of claim 15, wherein the external electrical power source includes electromagnetic communication equipment.

18. The device of claim 15, wherein the external electrical power source includes vehicle power systems.

19. The device of claim 14, wherein the magnetic sensor includes a telecoil.

20. The device of claim 14, wherein the magnetic sensor includes a solid state magnetic sensor.

21. The device of claim 14, wherein the at least one processor is further programmed to:

play the averaged clip in a repeating loop to create a cleaned up version of the periodic interference.

22. The device of claim 14, wherein the at least one processor is programmed to:

examine the clip samples of the signal;

identify one or more clip samples that contain primarily desired audio content; and exclude the identified one or more clip samples when creating the averaged clip of periodic interference.

23. The device of claim 22, wherein, to identify the one or more clip samples that contain primarily desired audio content, the at least one processor is programmed to:

compare the clip samples to an energy level threshold.

24. The device of claim 22, wherein, to identify the one or more clip samples that contain primarily desired audio content, the at least one processor is programmed to:

use an audio content classifier to identify the one or more clip samples.

25. The device of claim 14, wherein the hearing device includes a hearing aid.

26. The device of claim 14, wherein the hearing device includes a cochlear implant.

27. The device of claim 14, wherein the hearing device includes a bone-conduction hearing device.

* * * * *